United States Patent [19]

Miller

[11] 4,056,136

[45] Nov. 1, 1977

[54] PORTABLE TOOL GUIDE

[76] Inventor: Donald M. Miller, 1005 North Ave., Sunnyside, Wash. 98944

[21] Appl. No.: 704,469

[22] Filed: July 12, 1976

[51] Int. Cl.² .............................................. B27C 5/02
[52] U.S. Cl. ............................. 144/134 D; 30/296 R; 33/26; 90/12 D; 90/15 R; 125/11 F; 269/55; 269/101; 269/246; 269/289 R; 144/136 C
[58] Field of Search ............... 144/2 R, 134 R, 134 D, 144/136 R, 136 C, 137; 33/26, 78, 32 R, 32 B; 125/11 F; 269/55, 57, 71, 101, 251, 289 R, 1, 95, 99, 100; 90/12 R, 12 D, 15; 30/124 R, 296 R

[56] References Cited

U.S. PATENT DOCUMENTS

| 1,611,381 | 12/1926 | Salsbury | 90/12 R |
| 2,524,636 | 10/1950 | Preis et al. | 30/296 R |
| 2,584,003 | 1/1952 | Engelmann | 125/11 F |

FOREIGN PATENT DOCUMENTS

| 569,227 | 5/1945 | United Kingdom | 125/11 F |

*Primary Examiner*—Othell M. Simpson
*Assistant Examiner*—W. D. Bray
*Attorney, Agent, or Firm*—Wells, St. John & Roberts

[57] ABSTRACT

A guide apparatus for a portable tool, such as is used for carving or sculpturing wood. A maulstick is adapted to pivotally support the tool. It has a handle at one side, and is loosely guided by a post at its opposite side. The center portion of the maulstick includes an offset yoke that movably supports the portable tool. A support table has a turntable for holding a workpiece engaged by peripheral clamps.

10 Claims, 11 Drawing Figures

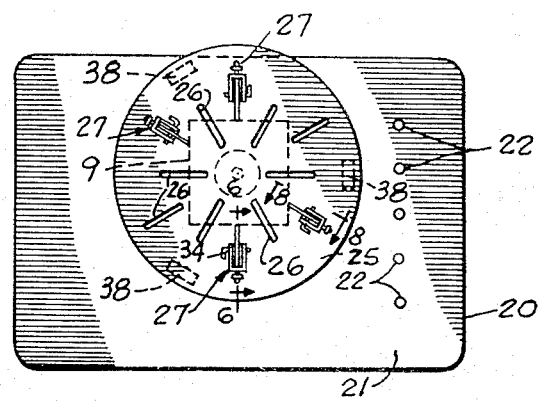
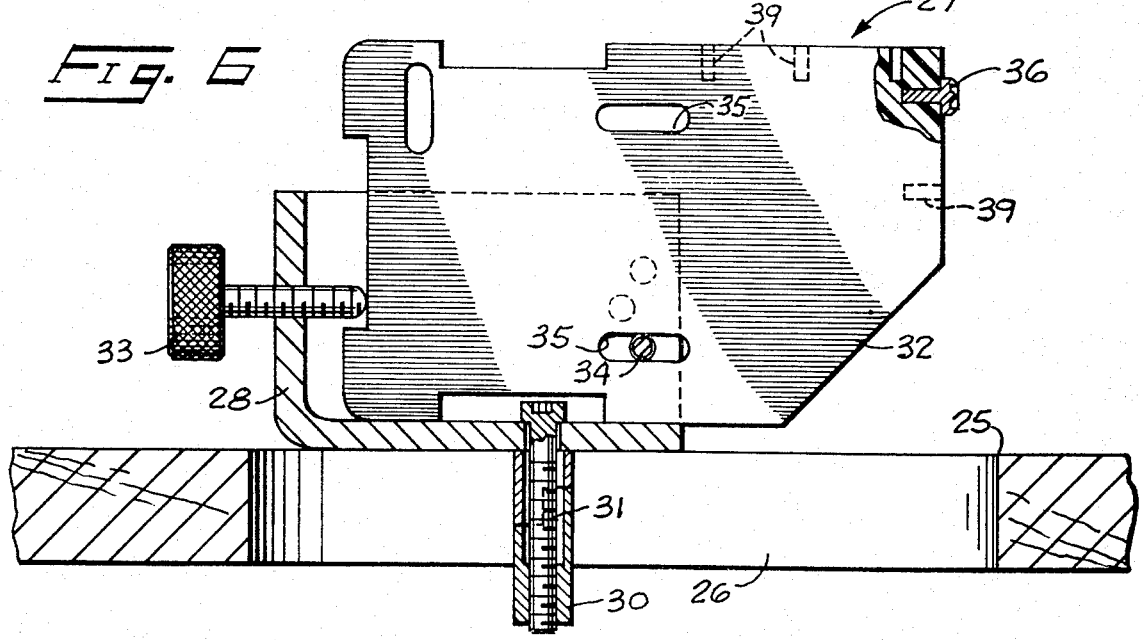
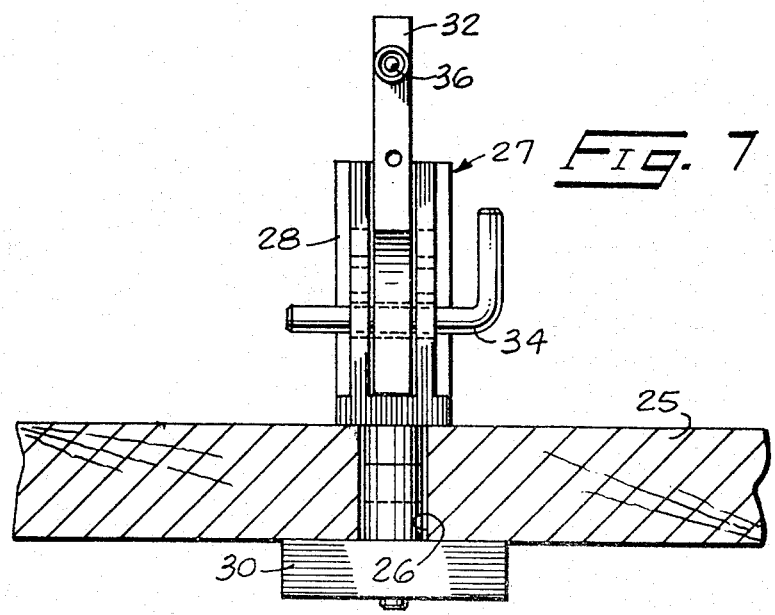

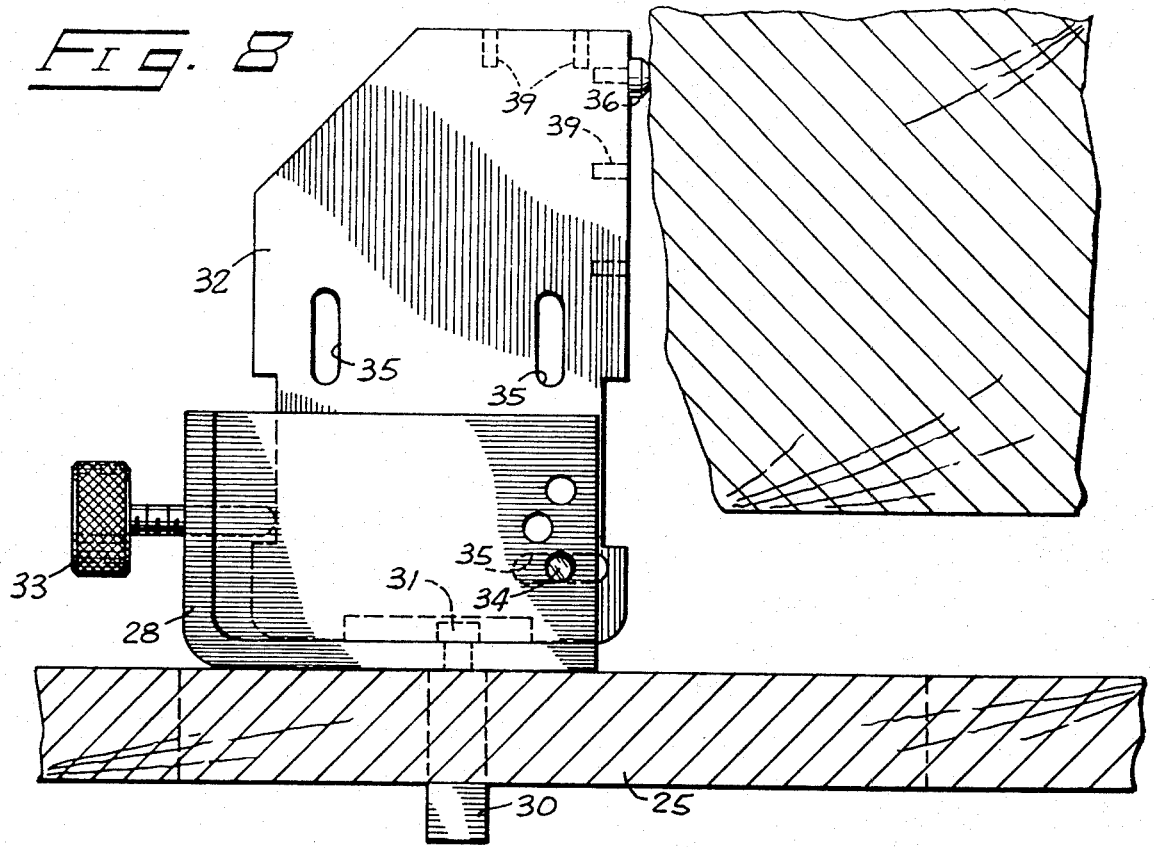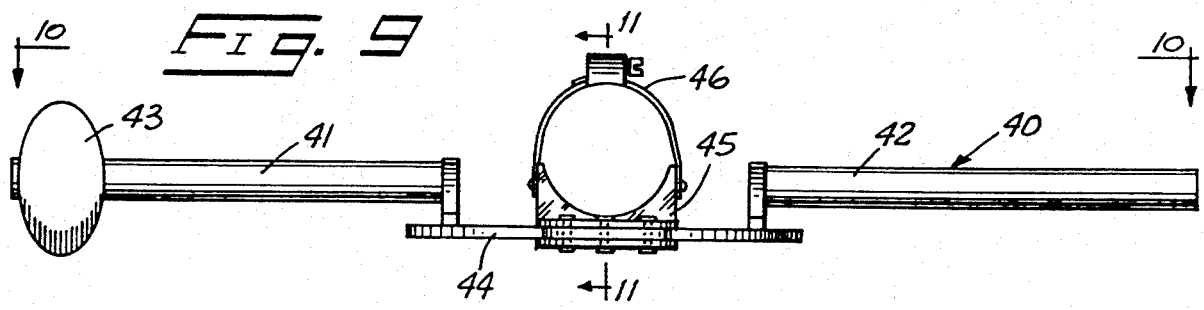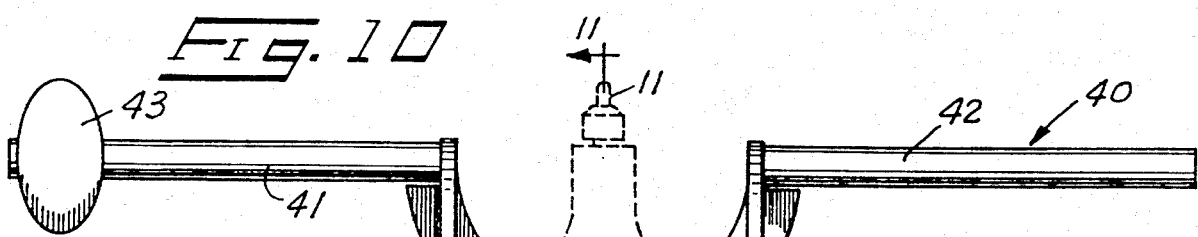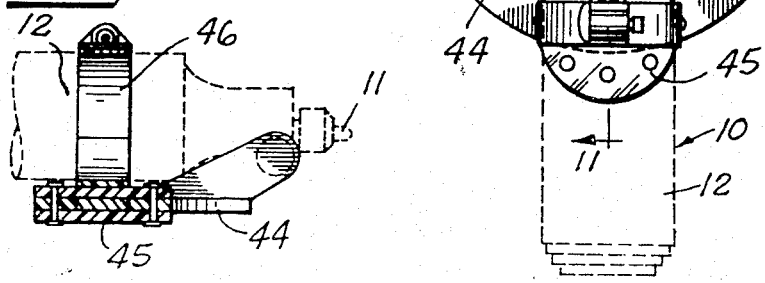

PORTABLE TOOL GUIDE

BACKGROUND OF THE INVENTION

Portable power tools are utilized to reduce the time and effort required in freehand wood surfacing procedures such as carving or sculpturing. They can be used for sculpturing in various mediums other than wood. Portable tools are also used for decorative and finishing purposes, such as engraving and woodburning. Many different tools are available for this purpose, but they each generally comprise a cylindrical housing having a work-engaging tool projecting axially at one end. The tools typically are provided with a cord at their remaining end for connection to a power outlet, although they also can be battery operated. While such tools are designed to be held and guided by one hand, it requires considerable skill to move the tool accurately about a workpiece without external support. Guidance is particularly important to the user when carving letters, geometric figures, straight lines, or arcs and other design elements which require accurate alignment relative to one another. It is also important when planing flat background or foreground areas.

Movable powered tools having mechanical guides have been previously proposed, primarily for engraving purposes. An early carving machine with a movable element controlled by a handle is shown in Cottrell U.S. Pat. No. 144,745, which was patented in 1873. Guiding arms on an engraving machine were illustrated in a patent to Skinner, U.S. Pat. No. 285,695, patented in 1883. Movable guides for routers are illustrated in prior patents to Lloyd, U.S. Pat. No. 366,329, (1887); Carter, U.S. Pat. No. 1,638,086 (1927); Pfau U.S. Pat. No. 1,958,203 (1934); and Stewart, U.S. Pat. No. 2,639,208 (1954). However these patents do not illustrate a handheld guide for mounting a portable tool for absolute freedom of movement in any direction to facilitate freehand surfacing about a workpiece.

According to the present invention, a rigid maulstick pivotally supports the portable tool. The maulstick is loosely supported along one side on a fixed guidepost so that the maulstick can be pushed, pulled, pivoted or turned relative to the workpiece. The portable tool in turn is pivotable with respect to the maulstick. By holding the free side of the maulstick in one hand and the portable tool in the other, the user is assured absolute freedom of movement for normal freehand use with the added benefit of a guiding frame to assist in maintaining the desired positioning of the tool at all times. The guide arrangement provides two handed control to assist in more accurately maintaining the required tool alignment relative to a fixed workpiece.

The principal apparatus disclosed herein is termed a "maulstick" in that it is somewhat analogous to painter's maulstick or "mahlstick", which is merely a wood stick on which a painter rests his brush for guiding purposes. While the portable tool is not rested on the present maulstick in the manner of a paintbrush, the guiding function afforded by the apparatus is believed to be aptly described by application of this term to the structure.

SUMMARY OF THE INVENTION

The guide for a portable tool comprises a rigid maulstick with means to mount the portable tool to the center portion of the maulstick for pivotal motion of the tool relative to the maulstick about an axis perpendicular to the axis of the tool element. The maulstick extends to both sides of the tool. An upright fixed guidepost has a support on which one side of the maulstick may be freely rested for reference purposes. It further comprises a support table having a pivotable turntable and clamps to engage and hold the workpiece as required.

It is a first object of this invention to provide a structurally simple guide to permit two handed manipulation of a portable axial tool for surfacing of wood or other solid material.

Another object of the invention is to provide such a guide which can be readily adapted for use with any conventional portable axial tool without requiring modification of the tool itself. The tool can be readily disengaged from the guide and used in its normal fashion when use of the guide is not desired.

An added advantage of the disclosed maulstick is the provision to guidance of the tool during straight line movements, which are otherwise very difficult to accomplish freehand.

These and further objects will be evident from the following disclosure and the accompanying drawings.

DESCRIPTION OF THE DRAWINGS

FIG. 5 is a plan view of the table, with a typical workpiece illustrated in phantom lines;

FIG. 6 is an enlarged fragmentary sectional view taken along line 6—6 in FIG. 5;

FIG. 7 is an enlarged fragmentary sectional view taken along line 7—7 in FIG. 5;

FIG. 8 is an enlarged framentary sectional view taken along line 8—8 in FIG. 5, showing the clamp in an alternate arrangement;

FIG. 9 is an elevational view of an alternate maulstick structure;

FIG. 10 is a plan view of the maulstick shown in FIG. 9; and

FIG. 11 is a sectional view taken along line 11—11 in FIG. 9.

DESCRIPTION OF THE PREFERRED EMBODIMENT

Figure 1:
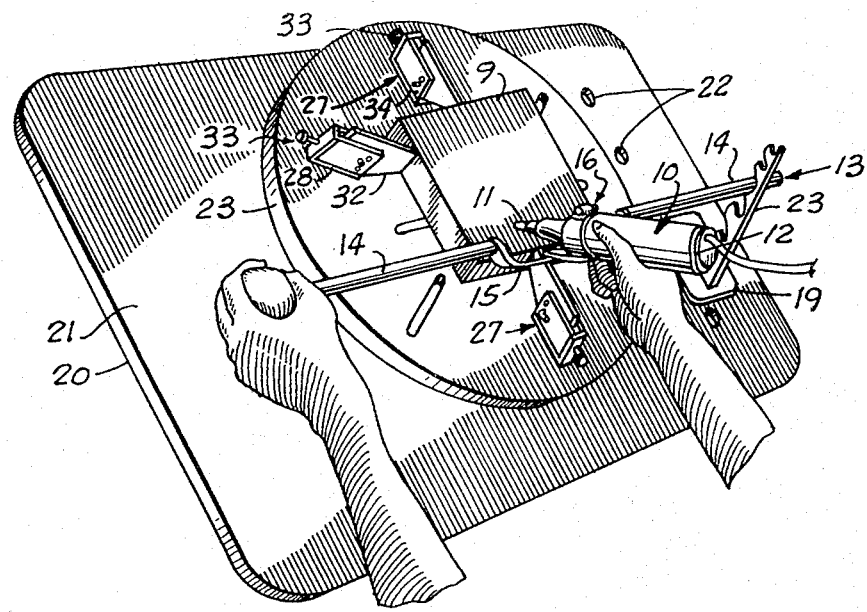
FIG. 1 is a perspective view showing the guide apparatus and supporting table.
Figure 2:
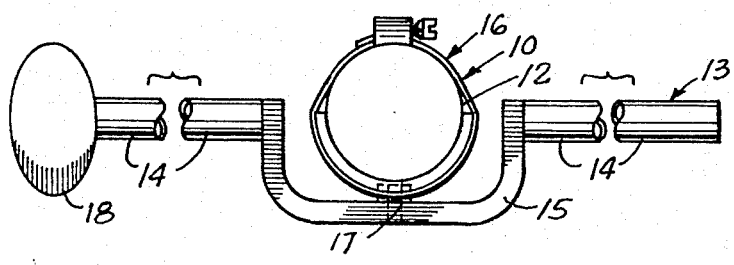
FIG. 2 is a plan view of the guide apparatus.
Figure 4:
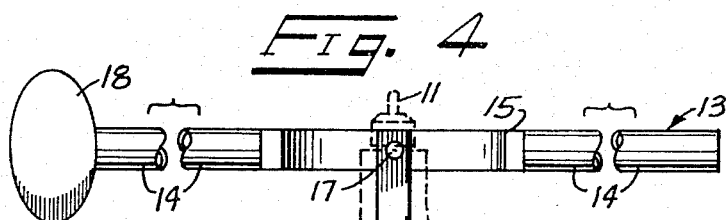
FIG. 4 is an elevational view of the apparatus in FIG. 2.
Figure 3:
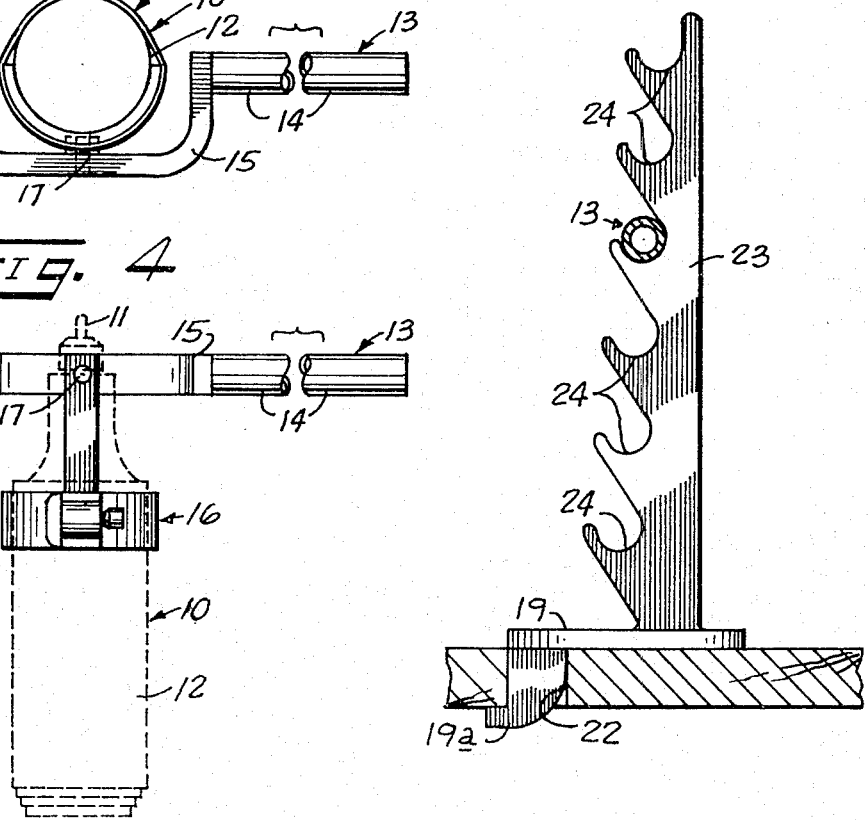
FIG. 3 is an end view of the apparatus in FIG. 2.

The guide apparatus described herein is used in conjunction with a portable tool for surfacing materials such as wood, plastic resins, etc. The tool itself can be a powered grinder or cutter, a rotary carver, an engraver, a woodburning tool, a drill motor or router, or any axial surfacing tool. Most such tools have a rotational vibrating or reciprocating element at one axial end for removing or cutting material or a stationary axial element for heating, burning, etc. It basically is applied to hand-held portable tools of the type having a generally cylindrical housing and an axial workpiece-engaging element protruding from one end of the housing. A typical portable tool is illustrated in the drawings at 10. The workpiece-engaging element 11 of tool 10 is aligned along a movable axis extending along its length. The axis in most instances will be the axis of rotation of the workpiece-engaging element or cutter. The tool housing is indicated by the reference numeral 12.

The portable tool 10 is mounted to the center of a rigid maulstick 13 which is hand-supported above the workpiece 9. Maulstick 13 basically comprises a straight shaft composed of two axially-aligned side sections 14 separated from one another at the center portion of the shaft. The side sections 14 are illustrated as being constructed by cylindrical tubing. They are joined at the center of maulstick 13 by a laterally offset yoke 15, illustrated as an arched metal section affixed to the adjacent ends of the two sections 14. An encircling tool clamp 16 is adapted to be engaged about the housing 12 of the portable tool to provide fixed attachment to the tool. Clamp 16 is connected to the center of yoke 15 by a pivotal connection indicated at 17. The pivotal connection is centered about an axis perpendicular to the central longitudinal axis of the maulstick shaft. The lateral offset of yoke 15 and design of tool clamp 16 is such that the movable tool axis along the portable tool 10 intersects the longitudinal center axis of the maulstick shaft. This axial relationship between the maulstick and portable tool permits turning and rotation of the maulstick and tool while maintaining the central intersection of their movable axes so as to eliminate tool movement other than that desired and controlled by the user.

One side of maulstick 13 is provided with an enlarged handle 18 affixed to it. Handle 18 is shown as an annular knob which is of a size comfortably grasped in the palm of the hand for control purposes. It can be fabricated from wood or any suitable material providing adequate frictional grip and a comfortable gripping surface. It may be located at the end of maulstick 13 or at any comfortable position to the one side of yoke 15.

The maulstick is utilized above a support table 20 having an upper planar surface 21. The table 20 can be in the form of an adjustable easel portably supported on a conventional table (not shown), or may be independently supported on the floor by adjustable pedestals or legs, (not shown), similar to the support arrangements conventionally used on drafting tables.

Along one side edge of the table surface 21 is a series of apertures 22. A second series of apertures (not shown) may be provided along the opposite side edge of table surface 21 as well. These extend through the table and are used to adjustably support a guidepost 23. The guidepost 23 is an upright structure having a plurality of ledges 24 along an inclined upright surface. The ledges 24 are inclined downwardly and are spaced so as to freely support the side of maulstick 13 opposite to handle 18. The maulstick rests on a selected ledge 24 in such fashion as to permit the maulstick 13 to be pivoted upwardly, downwardly, forwardly, or to the rear, and further permitting the maulstick 13 to slide axially or longitudinally, as well as to be pivoted about its center longitudinal axis. The plurality of ledges 25 permit adjustment of the elevation of maulstick 13 as desired.

Guidepost 23 is releasably mounted to support table 20 by a base 19 having a projecting lip 19a which catches the undersurface of table 20 as the base 19 is pivotally inserted through a selected aperture 22. The base 19 fits into the aperture 22 with sufficient interference to securely hold the guidepost 23 in a fixed position during use of the maulstick 13 to guide the portable tool 10.

An alternate form of guidepost (not shown) might comprise an upright post mounted to one side of table 20, with a movable bracket adjustable in height. The bracket would be apertured to receive one side of maulstick 13 and would be swivelled to allow the freedom of movement discussed above.

To provide accurate placement of a workpiece 9 under the portable tool 10, there is preferably provided a pivotal turntable 25 supported on the table 20. The turntable 25 is preferably circular in shape and is provided with a plurality of radial slots 26 to receive adjustable clamps 27 that secure the workpiece relative to the turntable 25. Turntable 25 is mounted to table 20 by a downwardly projecting shaft 37 received within a complementary aperture at the center of table 20. The lower surface of turntable 25 has projecting pads 38 which frictionally engage the upper surface of table 20 and prevent movement of the turntable 25 other than when desired.

The details of the clamps 27 are best illustrated in FIGS. 6 and 7. Each clamp 27 includes a rigid channel bracket 28 which is open inwardly and upwardly to receive a movable clamping plate 32. The channel brackets 28 are releasably affixed to turntable 25 through elongated slots 26. Each bracket 28 has a depending "T" bar 30 that can be pivoted as so to be aligned along channel bracket 28 for insertion through a slot 26. After insertion, each "T" bar 30 can be pivoted to overlap the surfaces adjacent to slot 26. The "T" bar 30 is then pulled upwardly toward the bracket 28 by a threaded bolt 31 accessible in the channel of each bracket 28. The bolt 31 is tightened to secure the bracket 28 in a chosen fixed position with respect to turntable 25.

After each channel bracket is secured to turntable 25, a clamping plate 32 is loosely inserted within the open upper channel. Plate 32 can be fabricated in almost any shape or size as the configuration of the workpiece might dictate. They are guided by a transverse retaining pin 34 which projects through the side plates of the channel brackets 28 and are received through elongated slots 35 formed through each clamping plate 32. The plates 32 can be inverted, depending upon the point of engagement desired between the plate 32 and the workpiece. The illustrated plates 32 can be horizontal (FIGS. 6, 7) or vertical (FIG. 8). A rear pressure adjustment bolt 33 threadably engaged through the back channel bracket 28 applies clamping pressure to each plate 32 against the workpiece. The inner end of each clamping plate 32 has a suitable workpiece-engaging element 36 projecting from a selected aperture 39. The element 36 can be a sharpened knife edge as shown, which could be used to engage a rough surface, or can be a cushioned surface (not shown) to engage a finished surface.

To use the guide apparatus, the workpiece 9 is first located on the turntable 25. It should be generally centered about the axis of turntable 25 so the turntable 25 can be pivoted to any angular position to assist the user. After locating the desired position of the workpiece 9, the clamps 27 are mounted to the turntable 25 so as to approximately engage the side edges of the workpiece at three or four locations about its periphery. Final positioning of workpiece 9 is accomplished by adjustment of the bolts 33 to press the clamping plates 32 against the side surfaces.

With the workpiece 9 in place, the user next selects the desired location of guidepost 23 on support table 20 and mounts the guidepost 23 through the selected aperture 22. The free side of maulstick 13 is then supported loosely on a chosen upwardly facing surface of a ledge 24. The inner surface of each ledge 24 is formed cylindrically and has a cylindrical diameter greater than the diameter of the shaft section 14. This assures free movement of maulstick 13 and accurate guidance of tool 10.

The user then grasps the portable tool 10 in one hand and the handle 18 in the other. By manipulating both the handle 18 and the tool 10, the workpiece-engaging element 11 of the portable tool 10 can be moved about the workpiece 9 to achieve any desired pattern of movement with complete freedom. The maulstick 13 greatly assists in forming accurate arcs and straight lines in any direction. The turntable 25 can be pivoted to align the workpiece at any angle required. The arm of the user that controls handle 18 can rest on the support table 20 to provide accurate depth control, which is particularly important when carving or sculpturing planar surfaces about the surface of the workpiece 10. An armrest (not shown) may be mounted to table 20 on the side opposite to guidepost 23 to assist in the manipulation and control of tool 10. The guide provides accurate support for the portable tool 10 without resorting to purely mechanical movement, which would stifle the artistry desired in surfacing materials such as wood.

FIGS. 9, 10 and 11 illustrate an alternate form of the maulstick, indicated generally by reference numeral 40. Maulstick 40 also comprises two axially aligned side sections 41, 42. The side 41 mounts an annular handle 43. Side 42 is designed to be loosely supported by engagement on a guidepost 23 as described above.

The two sides 41, 42 of maulstick 40 are joined by a yoke 44. Yoke 44 is illustrated as being offset from the longitudinal axis of maulstick 40. Yoke 44 comprises an arcuate guide having inner and outer circular edges generated about a center located along the axis of the tool element 11.

The tool is mounted by a slide 45 that surrounds the arcuate guide in yoke 44. Slide 45 is preferably made of a low friction material, such as a plastic resin. It is fixed to tool 10 by a releasable clamp 46. Tool 10 is thereby mounted to maulstick 40 for free guided motion similar to that described previously, but the area at yoke 44 is more unobstructed for viewing of the workpiece.

When guidance is not desired or is unnecessary, the portable tool 10 can be readily removed from the clamp 16 and used in a conventional fashion. No modification of the tool itself is required by the present apparatus, although the attachment elements could be designed integrally with the tool housing 12.

Various modifications might be made in the specific details illustrated, without deviating from the general scope of this disclosure. For this reason, only the following claims are intended as definitions of the invention set out herein.

Having thus described my invention, I claim:

1. A guide for a portable tool having a workpiece-engaging element aligned along a movable axis for surfacing operations, comprising:
   a rigid elongated maulstick comprising a shaft having two side sections extending outward from each side of an integral offset yoke at its center;
   and means for mounting a portable tool to the yoke of the maulstick for pivotal motion of the portable tool relative to the maulstick about an axis perpendicular to the movable axis of its workpiece-engaging element.

2. A guide as set out in claim 1 wherein:
   said last-named means comprises a releasable clamp for a portable tool and a movable connection between the clamp and the yoke;
   the clamp being movably mounted to the yoke for motion about an axis perpendicular to the longitudinal central axis of the maulstick.

3. A guide for a portable tool having a workpiece-engaging element aligned along a movable axis for surfacing operations, comprising:
   an elongated rigid maulstick comprising a shaft having two side sections aligned along a longitudinal axis, said side sections extending outward from each side of an integral offset yoke;
   support means on said yoke for pivotally mounting a portable tool about an axis perpendicular to the movable axis of its workpiece-engaging element;
   one side section of the maulstick having a cylindrical outer surface; and
   upright guidepost means having an upwardly-facing surface for loosely supporting said one side section of the maulstick.

4. A guide as set out in claim 3 wherein said guidepost has a plurality of open ledges formed along said upright surface, said one side of the maulstick being selectively rested on any of the open ledges.

5. A guide as set out in claim 3 wherein the remaining side of the maulstick has an enlarged handle, enabling the user to manipulate the maulstick with one hand while moving the portable tool with the other hand.

6. A guide as set out in claim 3 further comprising:
   a table having an upwardly-facing upper surface;
   means on the table inter-engageable by said guidepost for selectively mounting the guidepost at one of several locations about the table surface.

7. A guide as set out in claim 6, further comprising:
   workpiece holding means rotatably mounted to the table and adapted to be located beneath the maulstick.

8. A guide as set out in claim 7 wherein the workpiece holding means comprises:
   a circular turntable rotatably mounted to the table about an axis perpendicular to the upwardly-facing upper surface thereof;
   and a plurality of clamps mounted to the circular support for fixing a workpiece thereto.

9. In a guide for a portable tool having a workpiece-engaging element aligned along a movable axis for surfacing operations:
   a maulstick adapted to be loosely supported by resting one side section thereof on a support surface to one side of the workpiece, comprising:
   a cylindrical rigid shaft comprised of two axially aligned side sections separated from one another at the center portion of the shaft;
   a laterally offset yoke fixed integrally at the center portion of the shaft and joining the two axially aligned side sections thereof;
   tool support means for engagement with a portable tool, said tool support means being movably mounted to the center of said yoke for movement relative to the yoke about an axis perpendicular to the axis of the shaft sections, the movable axis of a portable tool being located by said tool support means so as to intersect the axis of the shaft sections.

10. The structure set out in claim 9 wherein said maulstick further comprises:
    an enlarged annular handle fixed to the remaining side section of the shaft to facilitate manipulation of the maulstick by one hand of a user controlling movement of a portable tool mounted thereby.

* * * * *